(12) United States Patent
Chen et al.

(10) Patent No.: US 10,507,885 B2
(45) Date of Patent: Dec. 17, 2019

(54) BICYCLE SYSTEM AND AUTOMATIC CONTROL SYSTEM THEREOF

(71) Applicant: Giant Manufacturing Co., Ltd., Taichung (TW)

(72) Inventors: Min-Chang Chen, Taichung (TW); Wei-Chieh Ho, Taichung (TW); Chung-Wei Lin, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 316 days.

(21) Appl. No.: 15/598,310

(22) Filed: May 18, 2017

(65) Prior Publication Data
US 2017/0334514 A1 Nov. 23, 2017

Related U.S. Application Data

(60) Provisional application No. 62/337,882, filed on May 18, 2016.

(30) Foreign Application Priority Data

May 2, 2017 (TW) .............................. 106114449 A

(51) Int. Cl.
 B62M 6/50 (2010.01)
(52) U.S. Cl.
 CPC ..................................... B62M 6/50 (2013.01)
(58) Field of Classification Search
 None
 See application file for complete search history.

(56) References Cited

U.S. PATENT DOCUMENTS

| 5,059,158 A | * | 10/1991 | Bellio | ...................... B62M 9/12 |
| | | | | 474/103 |
| 5,254,044 A | * | 10/1993 | Anderson | .............. B62M 9/122 |
| | | | | 474/103 |
| 5,992,553 A | * | 11/1999 | Morrison | ................. B62M 6/45 |
| | | | | 180/206.2 |

(Continued)

FOREIGN PATENT DOCUMENTS

| CN | 201105800 | 8/2008 |
| TW | 201132550 | 10/2011 |
| TW | I464089 | 12/2014 |

OTHER PUBLICATIONS

"Office Action of Taiwan Counterpart Application", dated Feb. 26, 2018, p1-p10.

*Primary Examiner* — Justin Holmes
(74) *Attorney, Agent, or Firm* — JCIPRNET

(57) ABSTRACT

An automatic control method suitable for a bicycle system is provided. The bicycle system has a gear ratio and a toque ratio formed by an auxiliary torque and a pedaling torque. The automatic control method includes following steps: sensing a pedaling cadence and the pedaling torque of the bicycle system in a riding state; setting a first cadence threshold and a second cadence threshold according to a preset pedaling cadence while the first cadence threshold is greater than the second cadence threshold; and determining whether the pedaling cadence is greater than the first cadence threshold or less than the second cadence threshold so as to set to increase or decrease the gear ratio. In addition, a bicycle system suitable for the automatic control method is also provided.

26 Claims, 13 Drawing Sheets

(56) References Cited

U.S. PATENT DOCUMENTS

| | | | | |
|---|---|---|---|---|
| 2012/0012412 A1* | 1/2012 | Moeller | ................... | B62M 6/45 |
| | | | | 180/206.2 |
| 2015/0120117 A1* | 4/2015 | Tsuchizawa | ............. | B62M 6/45 |
| | | | | 701/22 |
| 2016/0347407 A1* | 12/2016 | Tsuchizawa | ............. | B62M 6/50 |

* cited by examiner

BICYCLE SYSTEM AND AUTOMATIC CONTROL SYSTEM THEREOF

CROSS-REFERENCE TO RELATED APPLICATION

This application claims the priority benefit of U.S. provisional application Ser. No. 62/337,882, filed on May 18, 2016 and Taiwan application no. 106114449, filed on May 2, 2017. The entirety of each of the above-mentioned patent application is hereby incorporated by reference herein and made a part of this specification.

BACKGROUND OF THE INVENTION

1. Field of the Invention

The invention relates to an automatic control technology. More particularly, the invention relates to a bicycle system and an automatic control method thereof.

2. Description of Related Art

In recent years, the bicycle market develops rapidly; moreover, high-end racing bicycles as well as general bicycles for recreational use have both gained wide popularity among consumers. In recent years, in the technical field of the bicycle system, increasing attention has been paid to the bicycle system with auxiliary powering. Nevertheless, the bicycle system with auxiliary powering depend mainly on pedaling, such that when the bicycle system is used in different riding environments, riding states of a rider may be affected by the environments through the bicycle. In other words, as the bicycle system moves, the rider has to adjust or operate the bicycle system repeatedly so as to strike a balance among the rider, the bicycle, and the riding environment.

Nevertheless, in the present market, the bicycle system with auxiliary powering emphasizes only on whether the auxiliary powering works with the pedaling fore to achieve optimal outputs. Other device conditions of the bicycle system or riding scenarios are ignored. In other words, even though the auxiliary powering and the pedaling force have achieved optimal outputs, when the bicycle system moves, the rider still feels uncomfortable or may not be able to react timely when facing different riding scenarios. Therefore, how the bicycle system maintains a suitable pedaling cadence and pedaling torque in different riding scenarios and further provides the rider with steady riding effect and favorable riding experiences is an important issue.

SUMMARY OF THE INVENTION

The invention provides a bicycle system and an automatic control method thereof which are able to maintain a suitable pedaling cadence and pedaling torque and to provide steady riding effect.

An automatic control method provided by the embodiments of the invention is suitable for a bicycle system. The bicycle system has a gear ratio and a toque ratio formed by an auxiliary torque and a pedaling torque. The automatic control method includes that a pedaling cadence and a pedaling torque of the bicycle system in a riding state is sensed. A first cadence threshold and a second cadence threshold are then set according to a preset pedaling cadence. The first cadence threshold is greater than the second cadence threshold. Finally, whether the pedaling cadence is greater than the first cadence threshold or less than the second cadence threshold is determined to set to increase or decrease the gear ratio.

The bicycle system provided by the embodiments of the invention includes a sensing module, a control device, a gear device, and a motor device. The sensing module is configured to sense a pedaling cadence and a pedaling torque of the bicycle system in a riding state to output a pedaling cadence signal and a pedaling torque signal. The control device is coupled to the sensing module. The control device is configured to receive the pedaling cadence signal and the pedaling torque signal. The control device sets a first cadence threshold and a second cadence threshold according to a preset pedaling cadence. The first cadence threshold is greater than the second cadence threshold. The gear device is coupled to the control device. The gear device has a gear ratio. The motor device is coupled to the control device. The motor device is configured to provide an auxiliary torque. A torque ratio is formed by the auxiliary torque and the pedaling torque. The control device determines whether the pedaling cadence is greater than the first cadence threshold or less than the second cadence threshold to set to increase or decrease the gear ratio.

To sum up, the bicycle system and the automatic control method thereof provided by the embodiments of the invention may set two cadence thresholds according to the preset pedaling cadence and determine whether the pedaling cadence sensed by the sensing device is a higher cadence or a lower cadence according to the two cadence thresholds, so as to further determine whether to correspondingly adjust the gear ratio. Thereby, the bicycle system and the automatic control method thereof provided by the embodiments of the invention are able to effectively maintain a suitable pedaling cadence and to provide steady riding effect.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
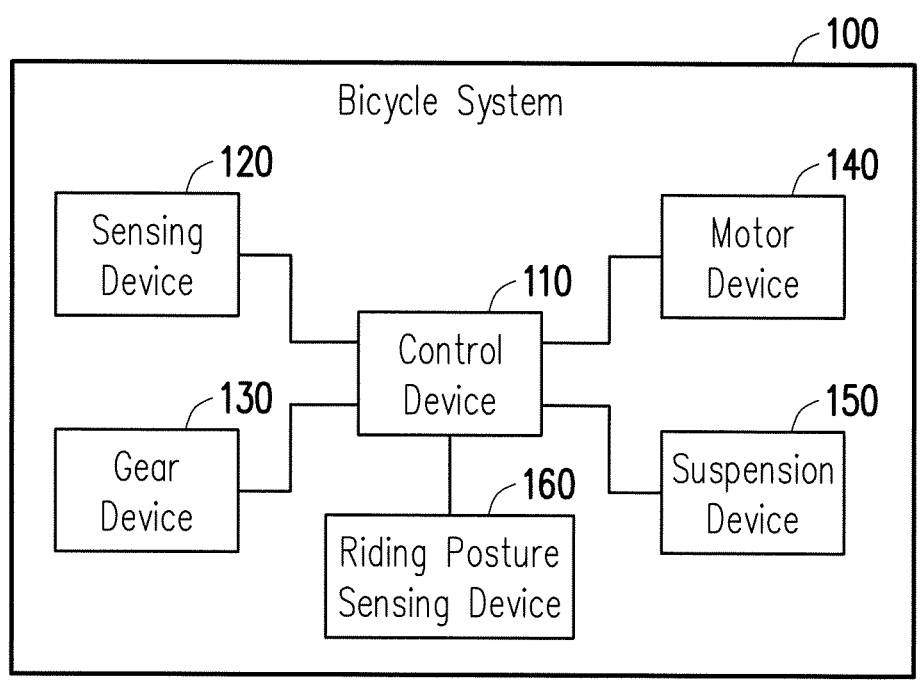
FIG. 1 is a block diagram of a bicycle system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a bicycle system according to an embodiment of the invention. Referring to FIG. 1, a bicycle system 100 includes a control device 110, a sensing device 120, a gear device 130, a motor device 140, a suspension device 150, and a riding posture sensing device 160. In the present embodiment, the sensing device 120 is coupled to the control device 110. The sensing device 120 is configured to sense a pedaling cadence and a pedaling torque of the bicycle system 100 in a riding state. The control device 110 may be configured to receive a pedaling cadence signal and a pedaling torque signal provided by the sensing device 120 and to receive a riding posture determination signal provided by the riding posture sensing device 160. Moreover, the control device 110 may respectively output a plurality of control signals to the gear device 130, the motor device 140, and the suspension device 150.

In the present embodiment, the control device 110 may respectively control the gear device 130, the motor device 140, and the suspension device 150 according to riding parameters. The riding parameters may include at least one of, for example, the pedaling cadence, pedaling torque signal, and the riding posture determination signal. In the present embodiment, the control device 110 may include, for example, a micro-controller, an embedded controller, a central processing unit (CPU), a field programmable gate array (FPGA), an application-specific integrated circuit (ASIC), or other similar elements. But the invention is not limited thereto. The control device 110 may be configured to run parameter operations in the embodiments of the invention and output the control signals in response to results of the parameter operations.

In the present embodiment, the control device 110 may further include a memory to store a plurality of operation modules. The operation modules may be, for example, auxiliary powering control modules and intelligence derailleur modules. The control device 110 may be configured to determine whether to adjust and control the gear device 130, the motor device 140, and the suspension device 150 according to the pedaling cadence and the pedaling torque sensed by the sensing device 120 through the auxiliary powering control modules and the intelligence derailleur modules.

In the present embodiment, the sensing device 120 may include, for example, a cadence sensor and a pedaling force sensor. The pedaling force sensor may be configured to sense a force of a rider pedaling bicycle pedals, and that a pedal length is multiplied by the force of the rider pedaling the bicycle pedals by the control device 110 or the sensing device 120 to obtain the pedaling torque. In other words, when the rider uses the bicycle system 100, the sensing device 120 may be configured to sense the pedaling cadence and the pedaling torque of the rider pedaling the bicycle system 100 and to correspondingly output the pedaling cadence signal and the pedaling torque signal to the control device 110. In the present embodiment, the pedaling cadence is the cadence of the rider pedaling the bicycle pedals in a time unit, and the unit may be revolution per minute (R.P.M.). The pedaling torque is calculated by multiplying the pedal length by the force of the rider pedaling the bicycle pedals, and the unit is lb-ft (pound-feet). But the invention is not limited to the operations of the sensing device described above. In one embodiment, the sensing device 120 may be integrated into a composite sensing device.

In the present embodiment, the gear device 130 may include, for example, a derailleur element, a plurality of front sprockets, and a plurality of rear sprockets. When the bicycle system 100 is in a riding state, the control device 110 may change the front sprockets and the rear sprockets operating with a chain through the derailleur element to change a gear ratio of the bicycle system 100. In the present embodiment, when the gear ratio of the gear device 130 increases, pedaling force required to be outputted by the rider correspondingly increases under the same cadence; nevertheless, a moving speed of the bicycle system 100 increases. On the contrary, when the gear ratio of the gear device 130 decreases, pedaling force required to be outputted by the rider correspondingly decreases under the same cadence; nevertheless, the moving speed of the bicycle system 100 slows down.

In the present embodiment, the motor device 140 may provide an auxiliary torque to the bicycle system 100. The bicycle system 100 may receive the auxiliary torque provided by the motor device 140 and the pedaling torque provided by the rider at the same time to rotate the gear device 130 and to drive the bicycle system 100. In the present embodiment, the control device 110 may output the control signals to the motor device 140 to control the auxiliary torque outputted by the motor device 140, and that the pedaling force required to be outputted by the rider can be reduced. In the present embodiment, a torque ratio is formed by the auxiliary torque and the pedaling torque. The control device 110 may determine the torque ratio according to a sensing result from the sensing device 120 and to further control a magnitude of the auxiliary torque outputted by the motor device 140.

In the present embodiment, the suspension device 150 may include at least one of, for example, a front fork suspension and a rear suspension. Two damping regulators may be respectively disposed in the front fork suspension and the rear suspension. The suspension device 150 may be configured to provide shock alleviation function according to a riding environment. In the present embodiment, the control device 110 may output the control signals to the suspension device 150 to adjust damping force of the front fork suspension or the rear suspension.

In the present embodiment, the riding posture sensing device 160 may be, for example, a force sensor. The riding posture sensing device 160 may be disposed in a saddle of the bicycle system 100 to sense whether a riding posture of the rider in the bicycle system 100 is a standing riding posture or a sitting riding posture, so as to output a riding posture sensing signal to the control device 110. But the invention is not limited thereto. In one embodiment, the riding posture sensing device 160 may also be disposed in other components of the bicycle system 100, e.g., in the suspension device 150. Alternatively, in another embodiment, the riding posture sensing device 160 may also be an optical sensor. The optical sensor may determine whether the rider is sitting on the saddle.

It is worth noting that the control device 110, the sensing device 120, the gear device 130, the motor device 140, the suspension device 150, and the riding posture sensing device 160 provided by the embodiments of the invention are not limited to operations described in the foregoing embodiments. Moreover, people having ordinary skill in the art may acquire sufficient teachings, suggestions, and other details related to the control device 110, the sensing device 120, the gear device 130, the motor device 140, the suspension device 150, and the riding posture sensing device 160 provided by the embodiments of the invention, and that detailed descriptions are not further provided hereinafter.

Figure 2:
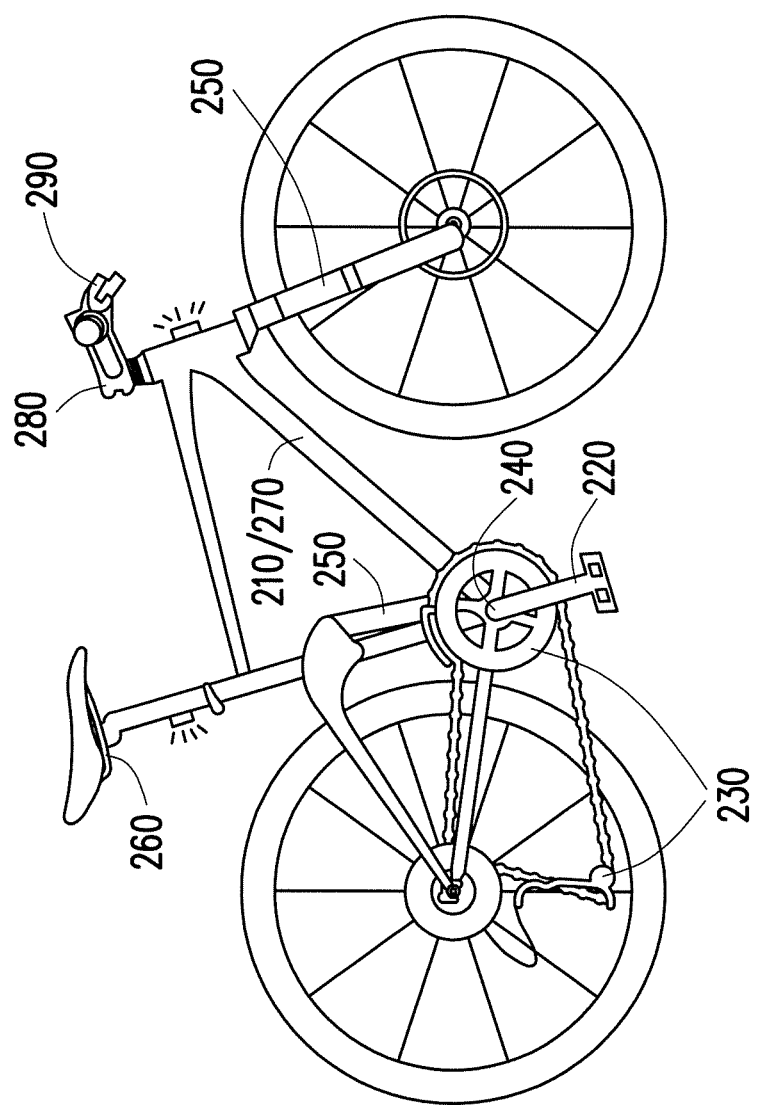
FIG. 2 is a schematic diagram of a bicycle system according to an embodiment of the invention.

FIG. 2 is a schematic diagram of a bicycle system according to an embodiment of the invention. Referring to FIG. 2, a bicycle system 200 may include a control device 210, a sensing device 220, a gear device 230, a motor device 240, a suspension device 250, and a riding posture sensing device 260. As shown in FIG. 2, the foregoing devices may be respectively disposed in corresponding positions of a bicycle body. Moreover, people having ordinary skill in the art may acquire sufficient teachings, suggestions, and other details related to the control device 210, the sensing device 220, the gear device 230, the motor device 240, the suspension device 250, and the riding posture sensing device 260 according to descriptions provided by the embodiment of FIG. 1, and that detailed descriptions are not further provided hereinafter.

In the present embodiment, the bicycle system 200 may further include a battery device 270, a display device 280, and a bottom device 290. The battery device 270 may be configured to provide electricity power required by the devices of the bicycle system 200. The display device 280 may be disposed on a central position of a handlebar of the bicycle body to display various riding information. For instance, the display device 280 may be configured to display the pedaling cadence and the pedaling torque sensed by the sensing device 220 or to further display the current gear ratio, the torque ratio or a suspension mode. The bottom device 290 may be disposed on one of the two end positions of the handlebar, such that the rider may control functions of the gear device 230, the motor device 240, and the suspension device 250 of the bicycle system 200 by himself/herself. Nevertheless, in the present embodiment, an exemplary embodiment of the bicycle system 200 in FIG. 2 is merely an example to illustrate how the devices of the bicycle system are disposed and should not be construed as a limitation to the invention.

Figure 3:
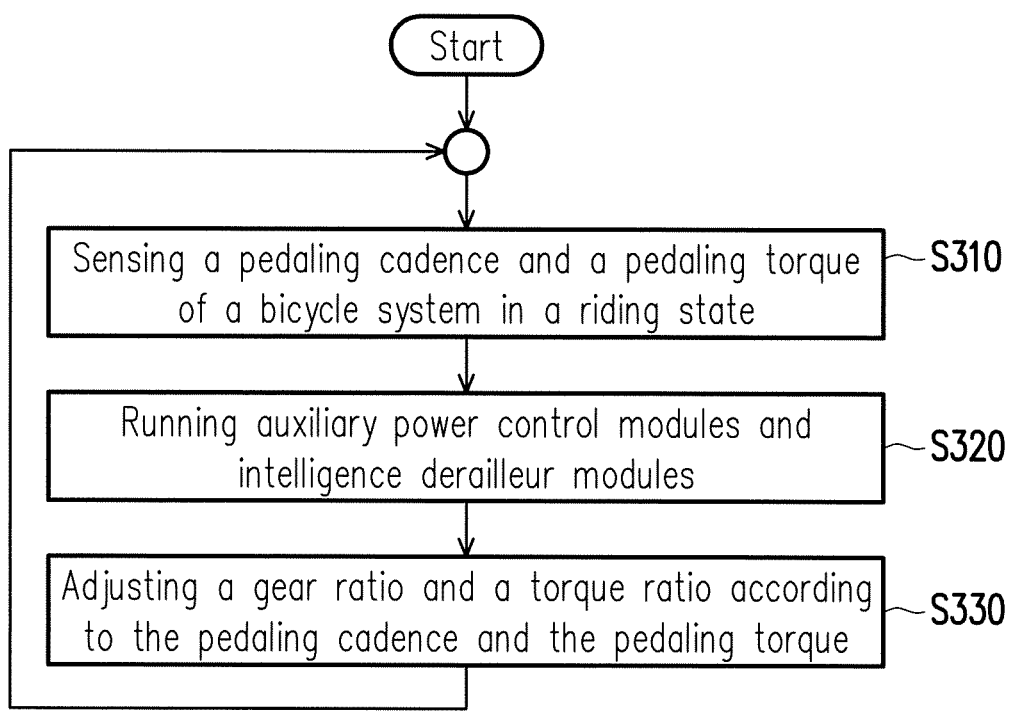
FIG. 3 is a flowchart of an automatic control method according to an embodiment of the invention.

FIG. 3 is a flowchart of an automatic control method according to an embodiment of the invention. Referring to FIG. 1 and FIG. 3, an automatic control method provided by the present embodiment is at least suitable for the bicycle system 100 of the embodiment in FIG. 1. In step S310, the sensing device 120 may sense the pedaling cadence and the pedaling torque of the bicycle system 100 in the riding state. In step S320, when the control device 110 receives the pedaling cadence signal and the pedaling torque signal provided by the sensing device 120, the control device 110 may run the auxiliary powering control modules and the intelligence derailleur modules to control the gear device 130 and the motor device 140. In step S330, the control device 110 may adjust the gear ratio and the torque ratio according to the pedaling cadence and the pedaling torque.

Several embodiments are provided below for those skilled in the art to further understand the automatic control method provided by the invention.

Figure 4:
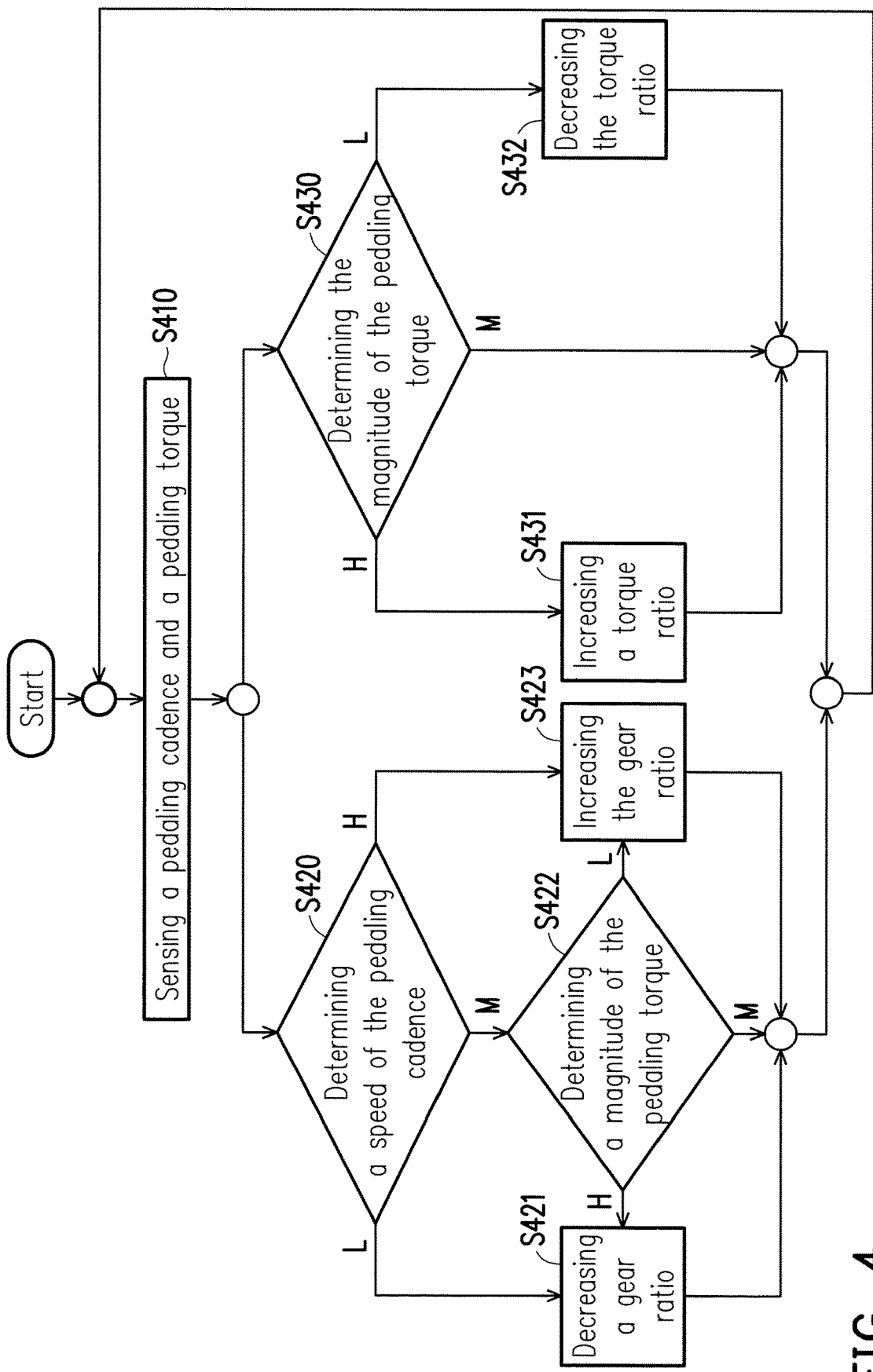
FIG. 4 is a flowchart of the first exemplary embodiment of an automatic control method according to the invention.

FIG. 4 is a flowchart of the first exemplary embodiment of an automatic control method according to the invention. Referring to FIG. 1 and FIG. 4, an automatic control method provided by the present embodiment is at least suitable for the bicycle system 100 in FIG. 1. Moreover, the following refers to the riding parameters listed in Table 1.

TABLE 1

| Pedaling Cadence | Pedaling Torque | Gear Ratio | Torque Ratio |
|---|---|---|---|
| Middle | Middle | = | Middle |
| High | Middle | Up | Middle |
| Low | Middle | Down | Middle |
| Middle | High | Down | High |
| Middle | Low | Up | Low |
| High | High | Up | High |
| Low | High | Down | High |
| Low | Low | Down | Low |
| High | Low | Up | Low |
| Middle | Middle | = | Middle |
| High | Middle | Up | Middle |
| Low | Middle | Down | Middle |
| Middle | High | Down | High |
| Middle | Low | Up | Low |
| High | High | Up | High |
| Low | High | Down | High |
| Low | Low | Down | Low |
| High | Low | Up | Low |

In the present embodiment, the control device 110 may set a first cadence threshold and a second cadence threshold may according to a preset pedaling cadence and set a first torque threshold and a second torque threshold according to a preset pedaling torque. The first torque threshold is greater than the second torque threshold. The control device 110 may set the first cadence threshold to be 110% of the preset pedaling cadence and set the second cadence threshold to be 90% of preset pedaling cadence. The control device 110 may set the first torque threshold to be 110% of the preset pedaling torque and set the second torque threshold to be 90% of preset pedaling torque. It is worth noting that the preset pedaling cadence and the preset pedaling torque may correspondingly set a suitable torque value and a suitable cadence according to requirements from a user or equipment conditions, which should not be construed as a limitation to the invention. In other words, the control device 110 may preset a preset pedaling cadence and a preset pedaling torque may and further sets two cadence thresholds and two torque thresholds respectively according to the preset pedaling cadence and the preset pedaling torque. Thereby, the control device 10 may determine outputs of the pedaling cadence and the pedaling torque sensed by the sensing device 120 respectively through the two cadence thresholds and the two torque thresholds, such that the control device 110 may correspondingly adjust the gear ratio and the torque ratio.

In table 1, the symbol "High" of the pedaling cadence refers to the pedaling cadence sensed is greater than the first cadence threshold. The symbol "Middle" of the pedaling cadence refers to the pedaling cadence sensed is between the first cadence threshold and the second cadence threshold. The symbol "Low" of the pedaling cadence refers to the pedaling cadence sensed is less than the first cadence threshold. In table 1, the symbol "High" of the pedaling torque refers to the pedaling torque sensed is greater than the first torque threshold. The symbol "Middle" of the pedaling torque refers to the pedaling torque sensed is between the first torque threshold and the second torque threshold. The symbol "Low" of the pedaling torque refers to the pedaling torque sensed is less than the second torque threshold.

In table 1, the symbol "Up" of the gear ratio refers to gear ratio increase. The symbol "Down" of the gear ratio refers to gear ratio decrease. The symbol "=" of the gear ratio refers to gear ratio not changed. In table 1, the symbol "High" of the torque ratio refers to a high auxiliary torque ratio, for example, the ratio of the auxiliary torque to the pedaling torque is 2:1. The symbol "Middle" of the torque ratio refers to a middle auxiliary torque ratio, for example, the ratio of the auxiliary torque to the pedaling torque is 1:1. The symbol "Low" of the torque ratio refers to a low auxiliary torque ratio, for example, the ratio of the auxiliary torque to the pedaling torque is 1:2. But the invention is not limited thereto. In addition, the low auxiliary torque ratio indicates that the motor device 140 enters an eco mode to provide a lower auxiliary torque.

In step S410, the sensing device 120 senses the pedaling cadence and the pedaling torque of the bicycle system 100 in the riding state. In step S420, the control device 110 determines a speed of the pedaling cadence. When the control device 110 determines that the pedaling cadence is "Low" (corresponding to the symbol "L" in FIG. 4), the control device 110 executes step S421 to decrease the gear ratio. When the control device 110 determines that the pedaling cadence is "Middle" (corresponding to the symbol "M" in FIG. 4), the control device 110 executes step S422 to determine a magnitude of the pedaling torque. When the control device 110 determines that the pedaling cadence is "High" (corresponding to the symbol "H" in FIG. 4), the control device 110 executes step S423 to increase the gear ratio. In step S422, the control device 110 determines the magnitude of the pedaling torque. When the control device 110 determines that the pedaling torque is "High", the control device 110 executes step S421 to decrease the gear ratio. When the control device 110 determines that the pedaling torque is "Middle", the control device 110 does not adjust the gear ratio. When the control device 110 determines that the pedaling torque is "Low", the control device 110 executes step S423 to increase the gear ratio.

In other words, when the rider increases a pedaling speed, the control device 110 increases the gear ratio. When the rider decreases the pedaling speed, the control device 110 decreases the gear ratio. When the pedaling speed of the rider is moderate, the control device 110 further determines the magnitude of the pedaling torque. When the rider increases a pedaling force, the control device 110 determines to decrease the gear ratio. When the rider decreases the pedaling force, the control device 110 determines to increase the gear ratio.

In step S430, the control device 110 determines the magnitude of the pedaling torque. When the pedaling torque is "High", the control device 110 executes step S431 to increase the torque ratio. When the pedaling torque is "Middle", the control device 110 does not adjust the torque ratio. When the pedaling torque is "Low", the control device 110 executes step S432 to decrease the torque ratio. In other words, when the rider increases the pedaling force, the torque ratio is increased. When the rider decreases the pedaling force, the torque ratio is decreased.

Thereby, the bicycle system 100 provided by the present embodiment may respectively determine the pedaling cadence and the pedaling torque according to step S420 and step S430 so as to dynamically adjust the gear ratio and the torque ratio. As such, the bicycle system 100 may be maintained at a steady speed and further provides steady riding effect and favorable riding experiences.

Figure 5A:
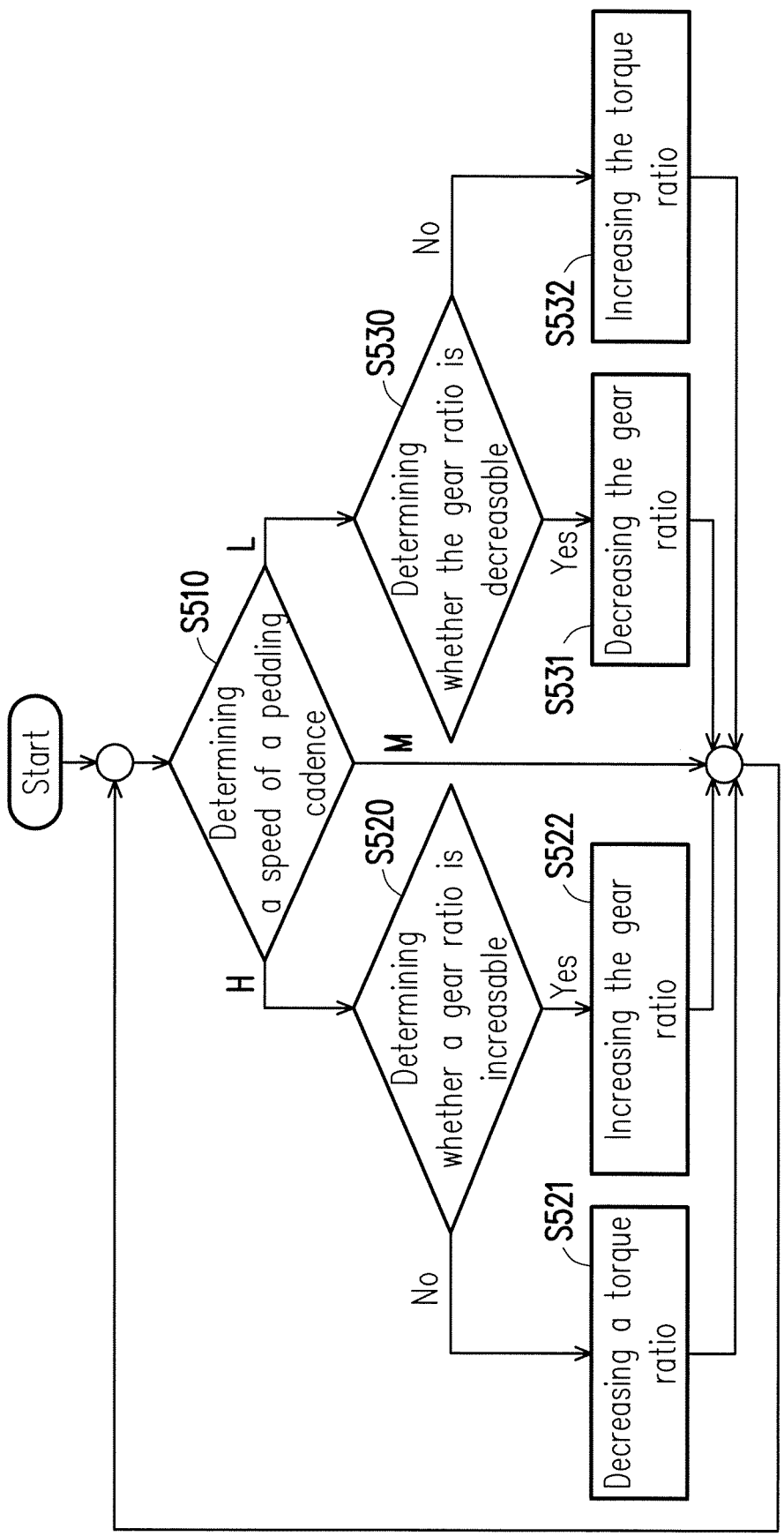
FIG. 5A is a flowchart of the second exemplary embodiment of an automatic control method according to an embodiment of the invention.
Figure 5B:
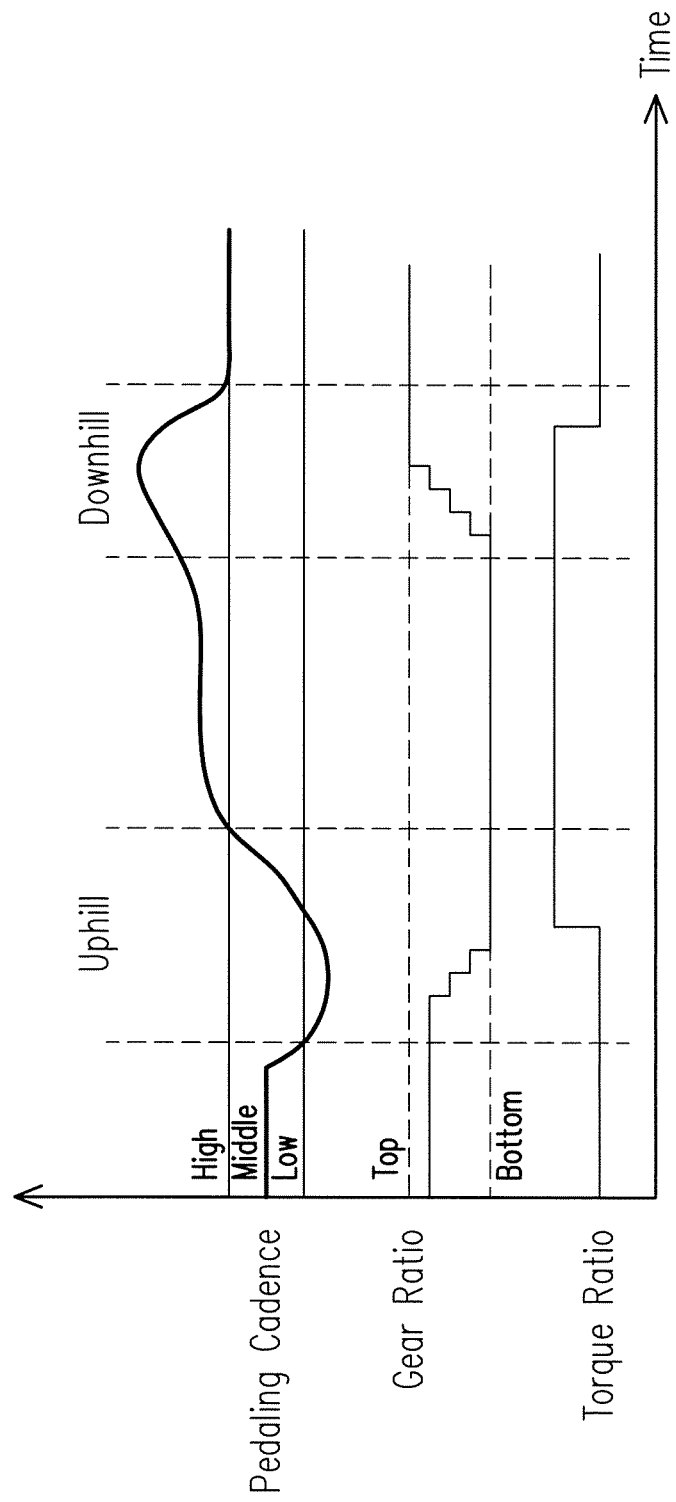
FIG. 5B is a timing chart of variations in riding parameters according to the embodiment of FIG. 5A.

FIG. 5A is a flowchart of the second exemplary embodiment of an automatic control method according to an embodiment of the invention. FIG. 5B is a timing chart of variations in riding parameters according to the embodiment of FIG. 5A. Referring to FIG. 1, FIG. 5A, and FIG. 5B, an automatic control method provided by the present embodiment is at least suitable for the bicycle system 100 in FIG. 1. Moreover, the following refers to the riding parameters listed in Table 2.

TABLE 2

| Pedaling Cadence | Whether Gear Ratio Adjustable | Gear Ratio | Torque Ratio |
| --- | --- | --- | --- |
| High | Yes | Up | = |
|  | No | = | Down |
| Middle | = | = | = |
| Low | Yes | Down | = |
|  | No | = | Up |

In table 2, the symbol "=" in each of the fields respectively refers to the gear ratio is not determined, the gear ratio is not adjusted, and the torque ratio is not adjusted. FIG. 1 may be referenced for the rest of the symbols, and thus detailed descriptions are not further provided hereinafter.

In step S510, the control device 110 determines a speed of the pedaling cadence. When the control device 110 determines that the pedaling cadence is "High", the control device 110 executes step S520 to determine whether the gear ratio is increasable. When the control device 110 determines that the pedaling cadence is "Middle", the control device 110 does not adjust the gear ratio nor the torque ratio. When the control device 110 determines that the pedaling cadence is "Low", the control device 110 executes step S530 to determine whether the gear ratio is decreasable. In step S520, when the control device 110 determines that the gear ratio is unincreasable, the control device 110 executes step S521 to decrease the torque ratio. Otherwise, when the control device 110 determines that the gear ratio is increasable, the control device 110 executes step S522 to increase the gear ratio. In step S530, when the control device 110 determines that the gear ratio is decreasable, the control device 110 executes step S531 to decrease the gear ratio. Otherwise, when the control device 110 determines that the gear ratio is undecreasable, the control device 110 executes step S532 to increase the torque ratio.

In other words, the bicycle system 100 provided by the present embodiment may determine whether the gear ratio is increasable or decreasable according to step S520 and step S530, so as to determine to correspondingly adjust the gear ratio or the torque ratio. For stance, referring to the timing chart shown in FIG. 5B, when the bicycle system 100 is in an uphill scenario, as the pedaling cadence decreases, the control device 110 thus decreases the gear ratio. Moreover, when the gear ratio is undecreasable (being adjusted to the lowest gear ratio), the control device 110 increases the torque ratio. Otherwise, when the bicycle system 100 is in a downhill scenario, as the pedaling cadence increases, the control device 110 thus increases the gear ratio. When the gear ratio is unincreasable (being adjusted to the highest gear ratio), the control device 110 decreases the torque ratio.

Thereby, the bicycle system 100 provided by the present embodiment may be suitable for the uphill and the downhill riding scenarios and may correspondingly adjust the gear ratio and the torque ratio. As such, the bicycle system 100 may be maintained at a steady speed and further provides steady riding effect and favorable riding experiences.

Figure 6A:
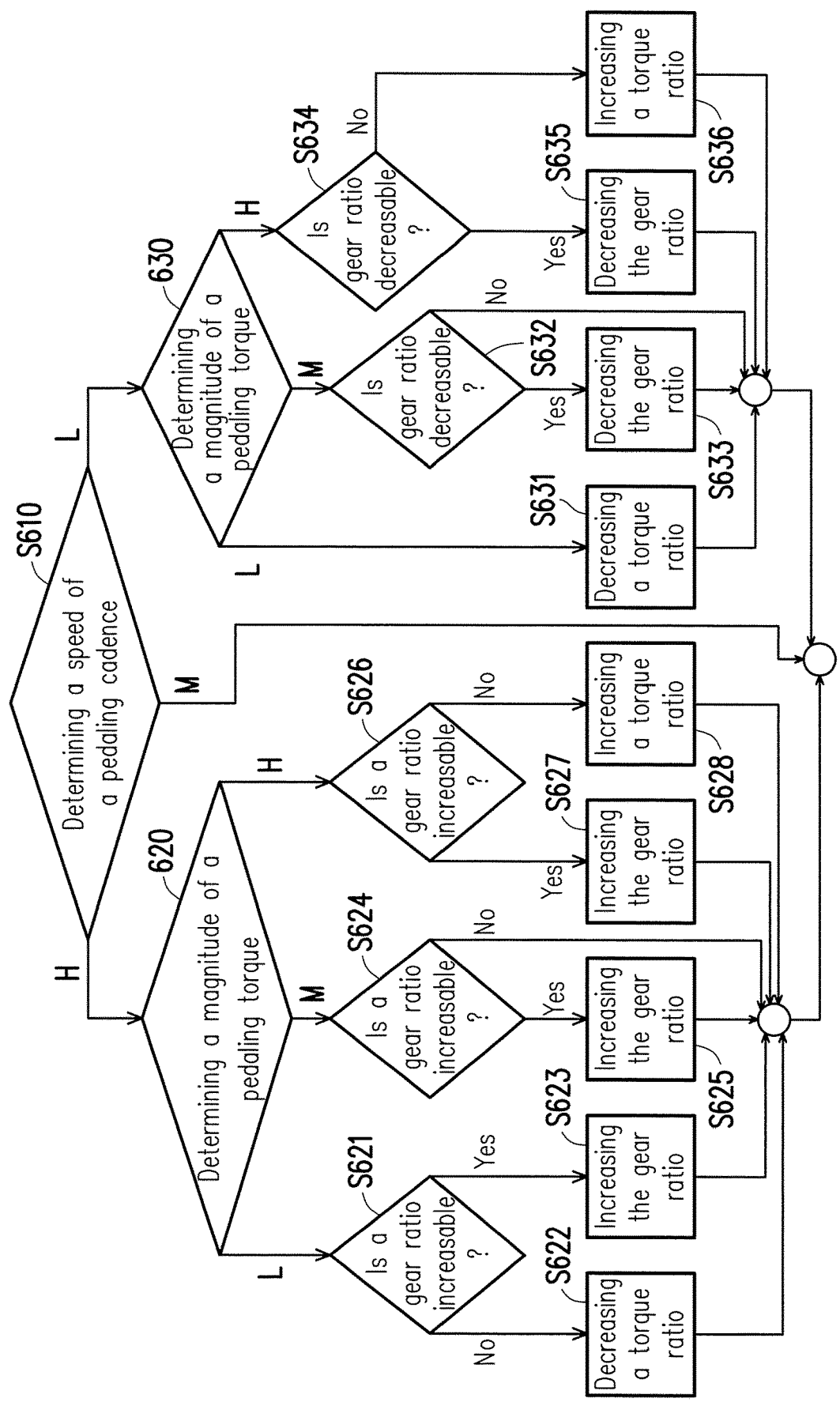
FIG. 6A is a flowchart of the third exemplary embodiment of an automatic control method according to an embodiment of the invention.
Figure 6B:
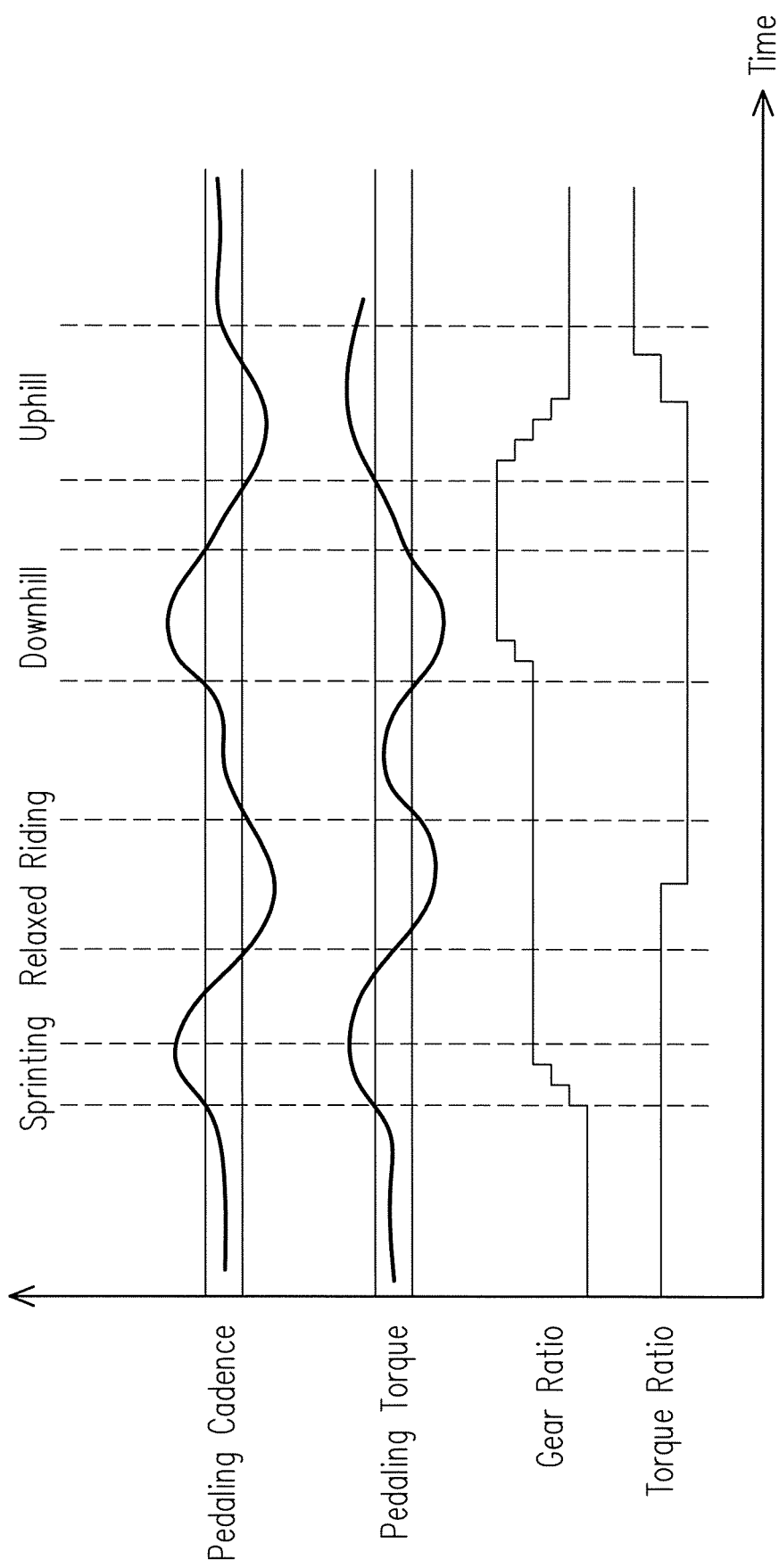
FIG. 6B is a timing chart of variations in riding parameters according to the embodiment of FIG. 6A.

FIG. 6A is a flowchart of the third exemplary embodiment of an automatic control method according to an embodiment of the invention. FIG. 6B is a timing chart of variations in riding parameters according to the embodiment of FIG. 6A. Referring to FIG. 1, FIG. 6A, and FIG. 6B, an automatic control method provided by the present embodiment is at least suitable for the bicycle system 100 in FIG. 1. Moreover, the following refers to the riding parameters listed in Table 3.

TABLE 3

| Pedaling Cadence | Pedaling Torque | Whether Gear Ratio Adjustable | Gear Ratio | Torque Ratio |
|---|---|---|---|---|
| High | High | Yes | Up | = |
|  |  | No | = | Up |
| High | Middle | Yes | Up | = |
|  |  | No | = | = |
| High | Low | Yes | Up | = |
|  |  | No | = | Down |
| Middle | = | = | = | = |
| Low | High | Yes | Down | = |
|  |  | No | = | Up |
| Low | Middle | Yes | Down | = |
|  |  | No | = | = |
| Low | Low | = | = | Down |

In Table 3, Table 1 and Table 2 may be referenced for the definitions of the symbols, and thus detailed descriptions are not further provided hereinafter.

In step S610, the control device 110 determines a speed of the pedaling cadence. When the control device 110 determines that the pedaling cadence is "High", the control device 110 executes step S620 to determine a magnitude of the pedaling torque. When the control device 110 determines that the pedaling cadence is "Middle", the control device 110 does not adjust the gear ratio nor the torque ratio. When the control device 110 determines that the pedaling cadence is "Low", the control device 110 executes step S630 to determine a magnitude of the pedaling torque.

In step S620, the control device 110 determines the magnitude of the pedaling torque. Moreover, the control device 110 further executes step S621, step S624, and step S626 according to the pedaling torque to determine whether the gear ratio is increasable. When the control device 110 determines that the gear ratio is increasable, the control device 110 respectively executes step S623, step S625, and step S627. Otherwise, when the control device 110 determines that the gear ratio is unincreasable, the control device 110 determines whether to adjust the torque ratio according to the magnitude of the pedaling torque. Thereby, when the control device 110 determines that the torque ratio is "Low", the control device 110 executes step S622 to decrease the torque ratio. When the control device 110 determines that the torque is "Middle", the control device 110 does not adjust the torque ratio. When the control device 110 determines that the torque ratio is "High", the control device 110 executes step S628 to increase the torque ratio.

In step S630, the control device 110 determines the magnitude of the pedaling torque, and the control device 110 further executes step S631, step S632, and step S634 according to the pedaling torque. When the pedaling torque is "Low", the control device 110 executes step S631 to decrease the torque ratio. When the control device 110 determines that the pedaling torque is "Middle" or "High", the control device 110 executes step S632 or step S634 to determine whether the gear ratio is decreasable. When the control device 110 determines that the gear ratio is decreasable, the control device 110 respectively executes step S633 and step S635. Otherwise, when the control device 110 determines that the gear ratio is unincreasable, the control device 110 determines whether to adjust the torque ratio according to the magnitude of the pedaling torque. Thereby, when the control device 110 determines that the pedaling torque is "Middle", the control device 110 does not adjust the torque ratio. When the control device 110 determines that the pedaling torque is "High", the control device 110 executes step S636 to increase the torque ratio.

In other words, the bicycle system 100 provided by the present embodiment may determine the speed of the pedaling cadence according to step S610 and further determines the magnitude of the pedaling torque, so as to determine whether to adjust the gear ratio or the torque ratio. For instance, referring to the timing chart shown in FIG. 6B, when the bicycle system 100 is in a sprinting scenario, as the pedaling cadence and the pedaling torque increase, the control device 110 thus increases the gear ratio. When the bicycle system 100 is in a relaxed riding scenario, as the pedaling cadence increases, the control device 110 thus decreases the torque ratio. When the bicycle system 100 is in the downhill scenario, as the pedaling cadence increases and the pedaling torque decreases, the control device 110 thus increases the gear ratio. When the bicycle system 100 is in the uphill scenario, as the pedaling cadence decreases but the pedaling torque increases, the control device 110 thus decreases the gear ratio. Moreover, f the gear ratio is undecreasable, the control device 110 increases the torque ratio.

Thereby, the bicycle system 100 provided by the present embodiment may be suitable for the sprinting, relaxed, uphill, and downhill riding scenarios and may correspondingly adjust the gear ratio and the torque ratio. As such, the bicycle system 100 may be maintained at a steady speed and further provides steady riding effect and favorable riding experiences.

Figure 7A:
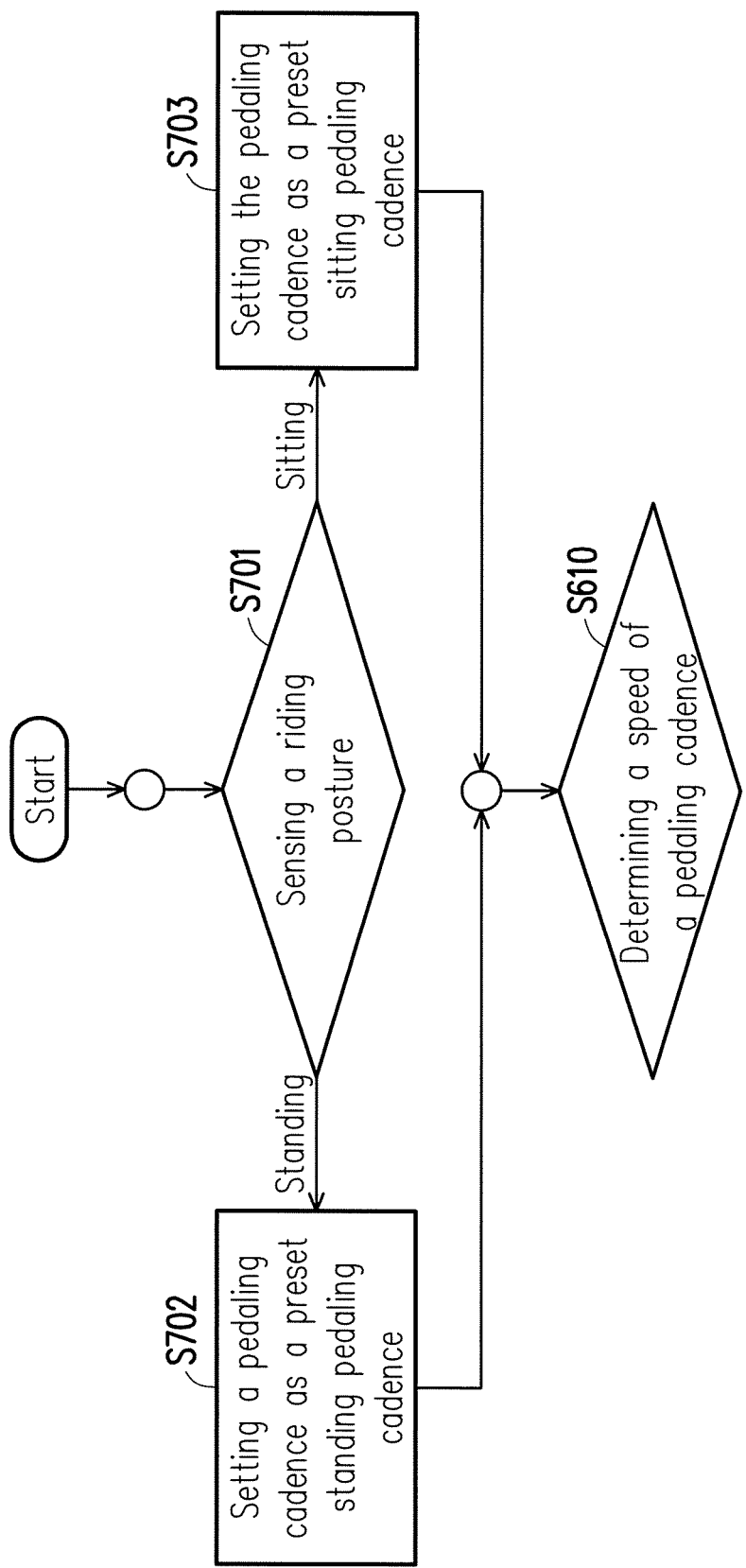
FIG. 7A is a flowchart of the fourth exemplary embodiment of an automatic control method according to an embodiment of the invention.
Figure 7B:
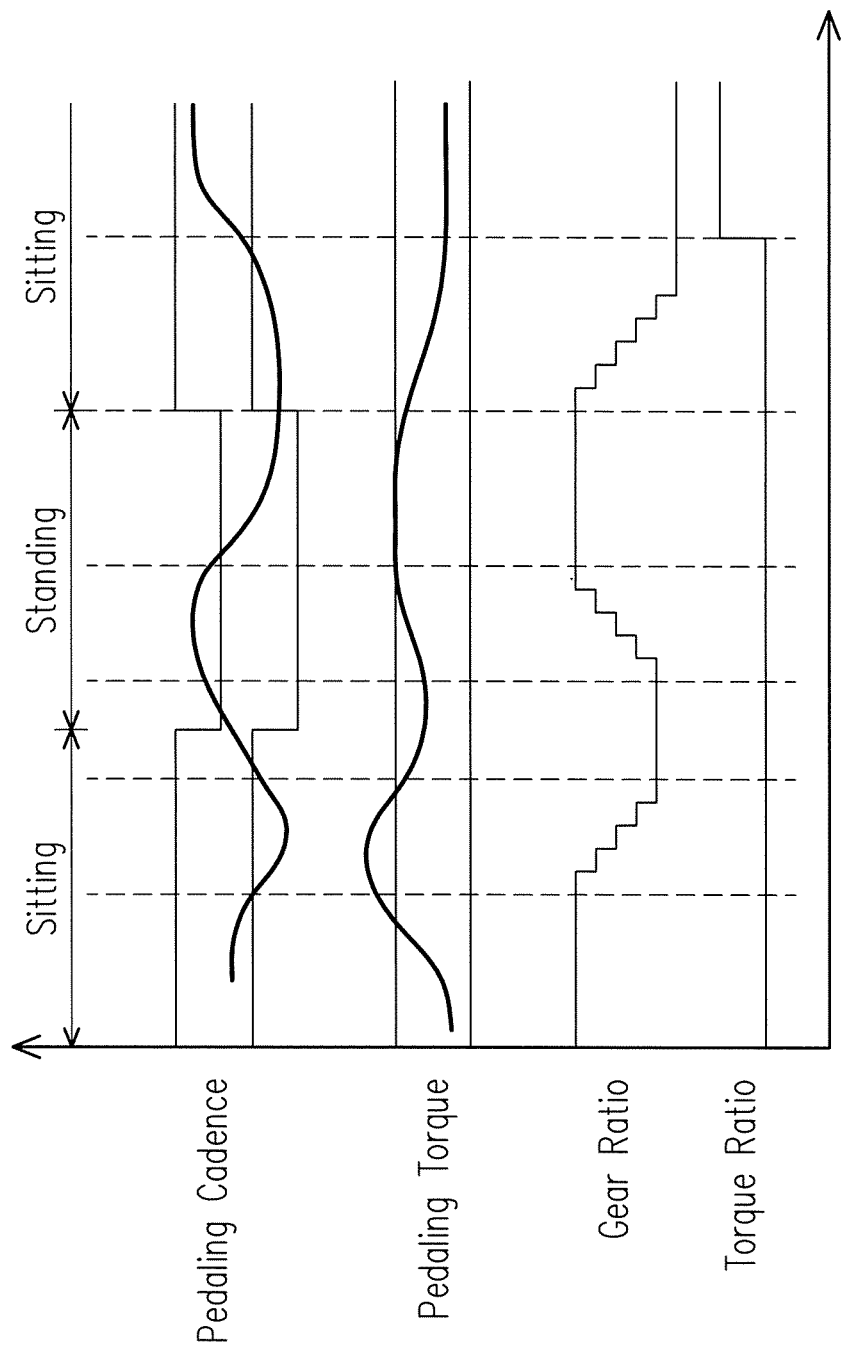
FIG. 7B is a timing chart of variations in riding parameters according to the embodiment of FIG. 7A.

FIG. 7A is a flowchart of the fourth exemplary embodiment of an automatic control method according to an embodiment of the invention. FIG. 7B is a timing chart of variations in riding parameters according to the embodiment of FIG. 7A. In the fourth embodiment, a riding posture is first determined so as to adjust corresponding preset pedaling cadence values. The control method after step S610 may be identical to that of the third embodiment. Referring to FIG. 1, FIG. 7A, and FIG. 7B, an automatic control method provided by the present embodiment is at least suitable for the bicycle system 100 in FIG. 1. In step S701, when the rider rides the bicycle system 100, the bicycle system 100 may sense a riding posture of the rider in a riding state according to the riding posture sensing device 160 and determines whether the riding posture of the rider is a standing riding posture or a sitting riding posture. In step S702 and step S703, the control device 110 may set a preset pedaling cadence as a preset standing pedaling cadence or a preset sitting pedaling cadence according to the riding posture. The preset sitting pedaling cadence is greater than the preset standing pedaling cadence. In other words, when the rider rides the bicycle system 100 with the standing riding posture, as the center of gravity changes considerably when the rider pedals, the pedaling cadence of the rider is thus lower, such that the control device 110 adjusts the preset pedaling cadence to be a lower cadence. When the rider rides the bicycle system 100 with the sitting riding posture, as the center of gravity changes only slightly when the rider pedals, the pedaling cadence of the rider is thus greater, such that the control device 110 adjusts the preset pedaling cadence to be a greater cadence. Moreover, the control device 110 of the present embodiment may continue to execute step S610. It is worth noting that the automatic control method of the present embodiment may continue to execute the flow process of FIG. 6. But the invention is not limited thereto.

In other words, the bicycle system 100 provided by the present embodiment may assist in determining the riding posture of the rider through the riding posture sensing device 160, so as to enhance determination accuracy of the bicycle system 100 and increase applicable scenarios of the bicycle system 100. For instance, referring to the timing chart shown in FIG. 7B, when the riding posture of the rider is the sitting posture, as the preset pedaling cadence set by the control device 110 is a higher cadence, such that the control device 110 may adjust the gear ratio more sensitively and accurately. Moreover, when the riding posture of the rider is the standing posture, as the preset pedaling cadence set by the control device 110 is a lower cadence, such that the control device 110 may similarly adjust the gear ratio more sensitively and accurately.

Thereby, the bicycle system 100 provided by the present embodiment may further determines the riding posture of the rider to adjust the gear ratio more accurately. As such, the bicycle system 100 may be maintained at a steady speed and further provides steady riding effect and favorable riding experiences.

Figure 8A:
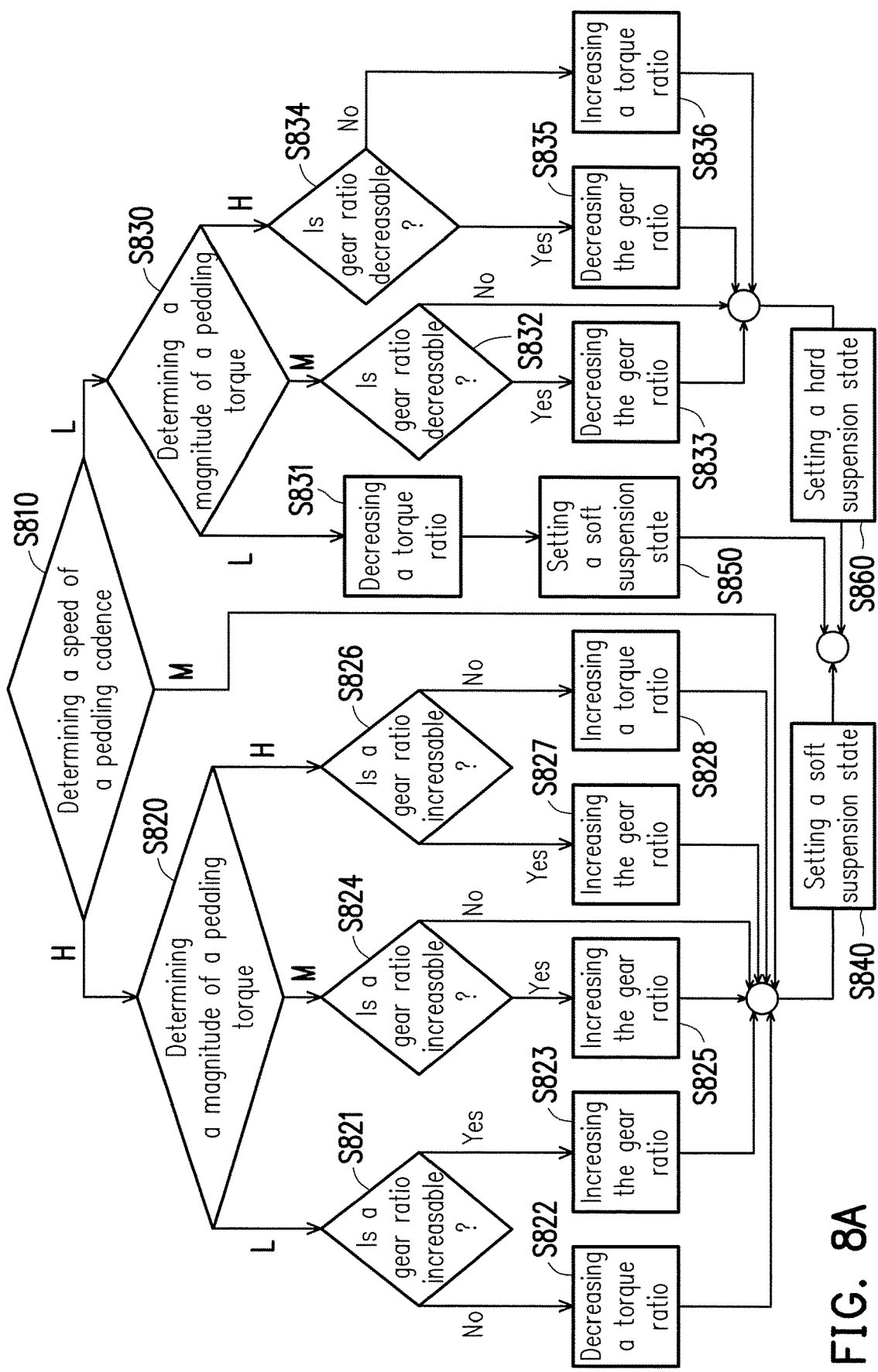
FIG. 8A is a flowchart of the fifth exemplary embodiment of an automatic control method according to an embodiment of the invention.
Figure 8B:
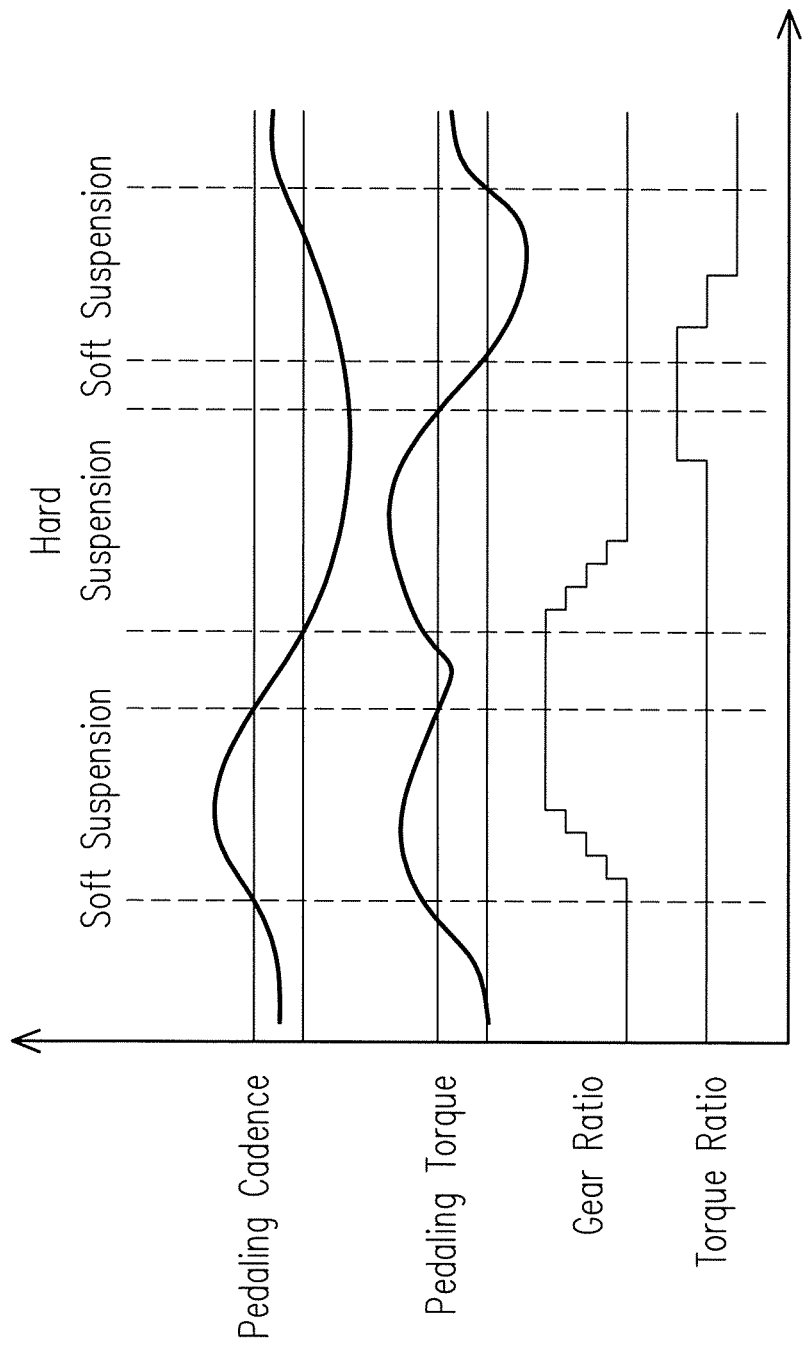
FIG. 8B is a timing chart of variations in riding parameters according to the embodiment of FIG. 8A.

FIG. 8A is a flowchart of the fifth exemplary embodiment of an automatic control method according to an embodiment of the invention. FIG. 8B is a timing chart of variations in riding parameters according to the embodiment of FIG. 8A. Referring to FIG. 1, FIG. 8A, and FIG. 8B, an automatic control method provided by the present embodiment is at least suitable for the bicycle system 100 in FIG. 1. Moreover, the following refers to the riding parameters listed in Table 4. It is worth noting that the flow process of the automatic control method of the present embodiment is an extended example of the embodiment of FIG. 6A. Thereby, the embodiment of FIG. 6A may be referenced for steps S810, S820, S821 to S828, S830, and S831 to S836, and thus detailed descriptions are not further provided hereinafter.

In Table 4, the symbol "Soft" of the suspension mode refers to a soft suspension mode, and the symbol "Firm" of the suspension mode refers to a hard suspension mode. Table 1 may be referenced for definitions of the rest of the symbols, and thus detailed descriptions are not further provided hereinafter. It is worth noting that the soft suspension mode may be the suspension device 150 in an Open state to provide softer suspension function. Moreover, the hard suspension mode may be the suspension device 150 in a Lock state to provide harder suspension function.

TABLE 4

| Pedaling Cadence | Pedaling Torque | Whether Gear Ratio Adjustable | Gear Ratio | Torque Ratio | Suspension Mode |
|---|---|---|---|---|---|
| High | High | Yes | Up | = | Soft |
|  |  | No | = | Up |  |
| High | Middle | Yes | Up | = |  |
|  |  | No | = | = |  |
| High | Low | Yes | Up | = |  |
|  |  | No | = | Down |  |
| Middle | = | = | = | = |  |
| Low | High | Yes | Down | = | Firm |
|  |  | No | = | Up |  |
| Low | Middle | Yes | Down | = |  |

TABLE 4-continued

| Pedaling Cadence | Pedaling Torque | Whether Gear Ratio Adjustable | Gear Ratio | Torque Ratio | Suspension Mode |
|---|---|---|---|---|---|
|  |  | No | = | = |  |
| Low | Low | = | = | Down | Soft |

In the present embodiment, the control device 110 may control the suspension device 150 to be operated in the soft suspension mode or the hard suspension mode. In step S810, when the control device 110 determines that the pedaling cadence is "High" or "Middle", the control device 110 controls the suspension device 150 to be operated in the soft suspension mode. When the control device 110 determines that the pedaling cadence is "Low", the control device 110 further determines a magnitude of the pedaling torque. When the pedaling torque is "Low", the control device 110 controls the suspension device 150 to be operated in the soft suspension mode. When the pedaling torque is "High" or "Middle", the control device 110 controls the suspension device 150 to be operated in the hard suspension mode.

In other words, the bicycle system 100 provided by the present embodiment may allow the rider to adjust suspension levels according to different riding scenarios through the suspension device 150, such that the bicycle system 100 may provide the rider with more comfortable riding experiences. For instance, referring to the timing chart of FIG. 8B, when the pedaling cadence is "High" and the pedaling torque is "High", the control device 110 controls the suspension device 150 to be operated in the soft suspension mode. When the pedaling cadence is "Low" and the pedaling torque is "High", the control device 110 controls the suspension device 150 to be operated in the hard suspension mode. When the pedaling cadence is "Low" and the pedaling torque is "Low", the control device 110 controls the suspension device 150 to be operated in the soft suspension mode. In other words, when the rider is in an easy environment for riding (e.g., flat ground or downhill) or finds it easy to ride, the suspension device 150 may be operated in the soft suspension mode. When the rider is in a difficult-riding environment (e.g., uphill) or finds it difficult to ride, the suspension device 150 may be operated in the hard suspension mode.

Figure 9:
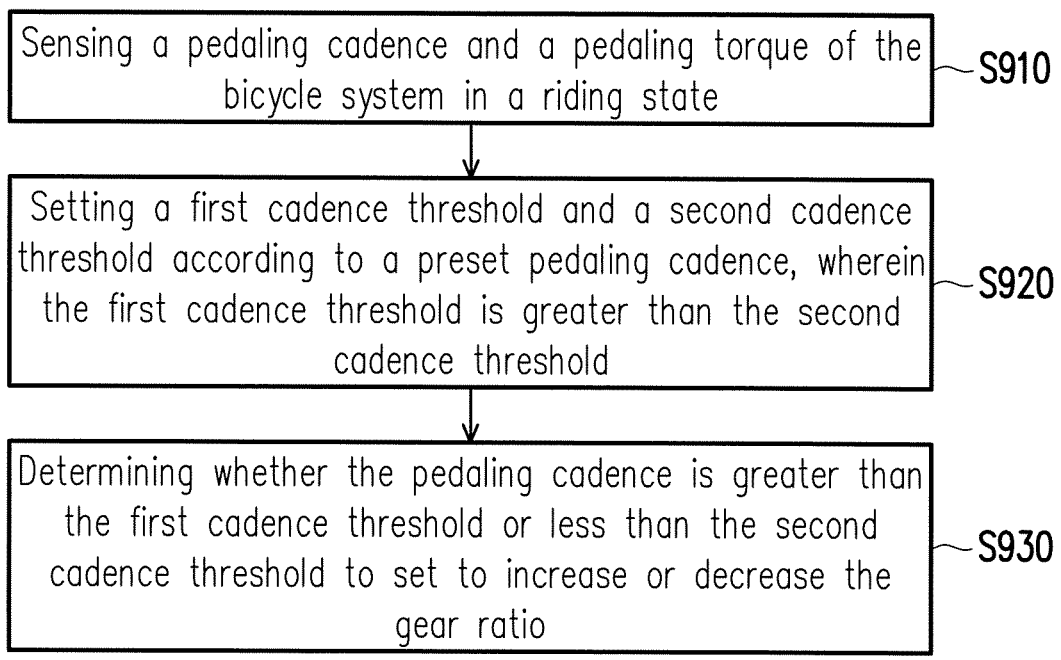
FIG. 9 is a flowchart of an automatic control method according to another embodiment of the invention.

FIG. 9 is a flowchart of an automatic control method according to another embodiment of the invention. Referring to FIG. 1 and FIG. 9, an automatic control method provided by the present embodiment is at least suitable for the bicycle system 100 in FIG. 1. In step S910, the sensing device 120 senses the pedaling cadence and the pedaling torque of the bicycle system 100 in the riding state. In step S920, the control device 110 sets a first cadence threshold and a second cadence threshold according to a preset pedaling cadence. The first cadence threshold is greater than the second cadence threshold. In step S930, the control device 110 determines whether the pedaling cadence is greater than the first cadence threshold or less than the second cadence threshold to set to increase or decrease the gear ratio. Thereby, the bicycle system 100 may automatically determine a speed of the pedaling cadence. As such, the bicycle system 100 may be maintained at a steady speed and provides steady riding effect and favorable riding experiences.

Moreover, people having ordinary skill in the art may acquire sufficient teachings, suggestions, and other details related to the automatic control method of the present embodiment and details of the devices and details of the embodiment of the bicycle system according to the embodiments of FIG. 1 to FIG. 8, and that detailed descriptions are not further provided hereinafter.

In view of the foregoing, the automatic control method and the bicycle system provided by the embodiments of the invention may allow the rider to automatically adjust the gear ratio, the torque ratio, and the suspension device corresponding to different riding postures, environments, and device statuses of the bicycle system, so as to provide the rider with favorable operability and pedaling efficiency. Moreover, the automatic control method and the bicycle system provided by the embodiments of the invention obtains necessary riding information or riding parameters visually through the display device, such that the rider does not have to adjust and operate the bicycle system repeatedly when enjoying riding. As such, the automatic control method and the bicycle system provided by the embodiments of the invention may provide steady riding effect and favorable riding experiences.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automatic control method, suitable for a bicycle system, the bicycle system having a gear ratio and a torque ratio formed by an auxiliary torque and a pedaling torque, wherein the method comprises:
   sensing a pedaling cadence and the pedaling torque of the bicycle system in a riding state;
   setting a first cadence threshold and a second cadence threshold according to a preset pedaling cadence, wherein the first cadence threshold is greater than the second cadence threshold; and
   determining when the pedaling cadence is greater than the first cadence threshold or less than the second cadence threshold so as to set to increase or decrease the gear ratio.

2. The automatic control method as claimed in claim 1, further comprising:
   setting a first torque threshold and a second torque threshold according to a preset pedaling torque, wherein the first torque threshold is greater than the second torque threshold; and
   determining when the pedaling torque is greater than the first torque threshold or less than the second torque threshold so as to set to increase or decrease the torque ratio.

3. The automatic control method as claimed in claim 1, further comprising:
   determining when the pedaling cadence is between the first cadence threshold and the second cadence threshold so as to set a first torque threshold and a second torque threshold according to a preset pedaling torque, wherein the first torque threshold is greater than the second torque threshold; and
   determining when the pedaling torque is greater than the first torque threshold or less than the second torque threshold so as to set to decrease or increase the gear ratio.

4. The automatic control method as claimed in claim 1, wherein the step of determining when the pedaling cadence is greater than the first cadence threshold or less than the second cadence threshold so as to set to increase or decrease the gear ratio comprises:
   determining when the gear ratio is increaseable when the pedaling cadence is greater than the first cadence threshold, wherein:
   the gear ratio is increased when the gear ratio is increaseable; and
   the torque ratio is decreased when the gear ratio is unincreaseable.

5. The automatic control method as claimed in claim 1, wherein the step of determining when the pedaling cadence is greater than the first cadence threshold or less than the second cadence threshold so as to set to increase or decrease the gear ratio comprises:
   determining when the gear ratio is decreaseable when the pedaling cadence is less than the first cadence threshold, wherein:
   the gear ratio is decreased when the gear ratio is decreaseable; and
   the torque ratio is increased when the gear ratio is undecreaseable.

6. The automatic control method as claimed in claim 1, wherein the step of determining when the pedaling cadence is greater than the first cadence threshold or less than the second cadence threshold so as to set to increase or decrease the gear ratio comprises:
   setting a first torque threshold and a second torque threshold according to a preset pedaling torque, wherein the first torque threshold is greater than the second torque threshold; and
   determining when the pedaling torque is greater than the first torque threshold, is between the first torque threshold and the second torque threshold, or is less than the second torque threshold and further determining when the gear ratio is increaseable so as to adjust the gear ratio or the torque ratio when the pedaling cadence is greater than the first cadence threshold.

7. The automatic control method as claimed in claim 6, wherein the step of further determining when the gear ratio is increaseable so as to adjust the gear ratio or the torque ratio comprises:
   increasing the gear ratio when the gear ratio is increaseable; and
   determining when to adjust the torque ratio according to a determination result of the pedaling torque when the gear ratio is unincreaseable.

8. The automatic control method as claimed in claim 1, wherein the step of determining when the pedaling cadence is greater than the first cadence threshold or less than the second cadence threshold so as to set to increase or decrease the gear ratio comprises:
   setting a first torque threshold and a second torque threshold according to a preset pedaling torque, wherein the first torque threshold is greater than the second torque threshold; and
   determining when the pedaling torque is greater than the first torque threshold, is between the first torque threshold and the second torque threshold, or is less than the second torque threshold and further determining when the gear ratio is decreaseable so as to adjust the gear ratio or the torque ratio when the pedaling cadence is less than the first cadence threshold.

9. The automatic control method as claimed in claim 8, wherein the step of further determining when the gear ratio is decreaseable so as to adjust the gear ratio or the torque ratio comprises:

setting to decrease the gear ratio or increase the torque ratio according to when the gear ratio is decreasable when the pedaling torque is greater than the first torque threshold;

setting to decrease the gear ratio according to when the gear ratio is decreasable when the pedaling torque is between the first torque threshold and the second torque threshold; and decreasing the torque ratio when the pedaling torque is less than the second torque threshold.

10. The automatic control method as claimed in claim 1, wherein the bicycle system further comprises a riding posture sensing device, and the method further comprises:

sensing a riding posture in the riding state and determining when the riding posture is a standing riding posture or a sitting riding posture; and setting the preset pedaling cadence as a preset standing pedaling cadence or a preset sitting pedaling cadence according to the riding posture, wherein the preset sitting pedaling cadence is greater than the preset standing pedaling cadence.

11. The automatic control method as claimed in claim 1, wherein the bicycle system further comprises a suspension device, and the method further comprises:

determining when the pedaling cadence is greater than the second cadence threshold so as to set the suspension device to be operated in a first suspension mode, wherein in the first suspension mode, the suspension device is configured to provide a soft suspension function.

12. The automatic control method as claimed in claim 1, wherein the bicycle system further comprises a suspension device, and the method further comprises:

determining when the pedaling cadence is less than the second cadence threshold so as to set a first torque threshold and a second torque threshold according to a preset pedaling torque, wherein the first torque threshold is greater than the second torque threshold;

setting the suspension device to be operated in a first suspension mode when the pedaling cadence is less than the second cadence threshold and the pedaling torque is less than the second torque threshold, wherein the first suspension mode, the suspension device is configured to provide a soft suspension function; and setting the suspension device to be operated in a second suspension mode when the pedaling cadence is less than the second cadence threshold and the pedaling torque is greater than the second torque threshold, wherein in the second suspension mode, the suspension device is configured to provide a hard suspension function.

13. The automatic control method as claimed in claim 1, further comprising:

displaying at least one of the auxiliary torque, the pedaling torque, the pedaling cadence, the torque ratio, and gear ratio, and preset pedaling cadence through a display device.

14. A bicycle system, comprising:

a sensing module, configured to sense a pedaling cadence and a pedaling torque of the bicycle system in a riding state so as to output a pedaling cadence signal and a pedaling torque signal;

a control device, coupled to the sensing module and configured to receive the pedaling cadence signal and the pedaling torque signal, the control device setting a first cadence threshold and a second cadence threshold according to a preset pedaling cadence, wherein the first cadence threshold is greater than the second cadence threshold;

a gear device, coupled to the control device and having a gear ratio; and a motor device, coupled to the control device and configured to provide an auxiliary torque, wherein a torque ratio is formed by the auxiliary torque and the pedaling torque;

wherein the control device determines when the pedaling cadence is greater than the first cadence threshold or less than the second cadence threshold so as to set to increase or decrease the gear ratio.

15. The bicycle system as claimed in claim 14, wherein the control device sets a first torque threshold and a second torque threshold according to a preset pedaling torque, wherein the first torque threshold is greater than the second torque threshold, and the control device determines when the pedaling torque is greater than the first torque threshold or less than the second torque threshold so as to set to increase or decrease the torque ratio.

16. The bicycle system as claimed in claim 14, wherein the control device determines when the pedaling cadence is between the first cadence threshold and the second cadence threshold so as to set a first torque threshold and a second torque threshold according to a preset pedaling torque, wherein the first torque threshold is greater than the second torque threshold, and the control device determines when the pedaling torque is greater than the first torque threshold or less than the second torque threshold so as to set to decrease or increase the gear ratio.

17. The bicycle system as claimed in claim 14, wherein the control device determines when the gear ratio is increasable when the pedaling cadence is greater than the first cadence threshold, wherein:

the control device increases the gear ratio when the gear ratio is increasable; and the control device decreases the torque ratio when the gear ratio is unincreasable.

18. The bicycle system as claimed in claim 14, wherein the control device determines when the gear ratio is decreasable when the pedaling cadence is less than the first cadence threshold, wherein:

the control device decreases the gear ratio when the gear ratio is decreasable; and the control device increases the torque ratio when the gear ratio is undecreasable.

19. The bicycle system as claimed in claim 14, wherein the control device sets a first torque threshold and a second torque threshold according to a preset pedaling torque, wherein the first torque threshold is greater than the second torque threshold, the control device determines when the pedaling torque is greater than the first torque threshold, is between the first torque threshold and the second torque threshold, or is less than the second torque threshold when the pedaling cadence is greater than the first cadence threshold, and the control device further determines when the gear ratio is increasable so as to adjust the gear ratio or the torque ratio.

20. The bicycle system as claimed in claim 19, wherein:

the control device increases the gear ratio when the gear ratio is increasable; and the control device determines when to adjust the torque ratio according to a determination result of the pedaling torque when the gear ratio is unincreasable.

21. The bicycle system as claimed in claim 14, wherein the control device sets a first torque threshold and a second torque threshold according to a preset pedaling torque, wherein the first torque threshold is greater than the second torque threshold, the control device determines when the pedaling torque is greater than the first torque threshold, is between the first torque threshold and the second torque threshold, or is less than the second torque threshold when the pedaling cadence is less than the first cadence threshold, and the control device further determines when the gear ratio is decreasable so as to adjust the gear ratio or the torque ratio.

22. The bicycle system as claimed in claim 21, wherein
the control device sets to decrease the gear ratio or increase the torque ratio according to when the gear ratio is decreasable when the pedaling torque is greater than the first torque threshold;

the control device sets to decrease the gear ratio according to when the gear ratio is decreasable when the pedaling torque is between the first torque threshold and the second torque threshold; and the control device decreases the torque ratio when the pedaling torque is less than the second torque threshold.

23. The bicycle system as claimed in claim 14, further comprising:

a riding posture sensing device, coupled to the control device and configured to sense when a riding posture is a standing riding posture or a sitting riding posture in the riding state so as to output a riding posture sensing signal, wherein the control device receives the riding posture sensing signal and sets the preset pedaling cadence as a preset standing pedaling cadence or a preset sitting pedaling cadence according to the riding posture sensing signal, wherein the preset sitting pedaling cadence is greater than the preset standing pedaling cadence.

24. The bicycle system as claimed in claim 14, further comprising:

a suspension device, coupled to the control device and having a first suspension mode and a second suspension mode, wherein in the first suspension mode, the suspension device is configured to provide a soft suspension function, wherein in the second suspension mode, the suspension device is configured to provide a hard suspension function, wherein the control device determines when the pedaling cadence is greater than the second cadence threshold so as to set the suspension device to be operated in the first suspension mode.

25. The bicycle system as claimed in claim 14, further comprising:

a suspension device, coupled to the control device and having a first suspension mode and a second suspension mode, wherein in the first suspension mode, the suspension device is configured to provide a soft suspension function, wherein in the second suspension mode, the suspension device is configured to provide a hard suspension function, wherein the control device determines when the pedaling cadence is less than the second cadence threshold so as to set a first torque threshold and a second torque threshold according to a preset pedaling torque, wherein the first torque threshold is greater than the second torque threshold, wherein:

the control device sets the suspension device to be operated in the first suspension mode when the pedaling cadence is less than the second cadence threshold and the pedaling torque is less than the second torque threshold; and the control device sets the suspension device to be operated in the second suspension mode when the pedaling cadence is less than the second cadence threshold and the pedaling torque is greater than the second torque threshold.

26. The bicycle system as claimed in claim 14, further comprising:

a display device, coupled to the control device and configured to display at least one of the auxiliary torque, the pedaling torque, the pedaling cadence, the torque ratio, the gear ratio, and the preset pedaling cadence.

* * * * *